US011678672B2

(12) United States Patent
Covone et al.

(10) Patent No.: US 11,678,672 B2
(45) Date of Patent: Jun. 20, 2023

(54) MACHINE FOR MAKING A FOOD ROLL

(71) Applicant: KONOMAC S.r.l., Brescia (IT)

(72) Inventors: Marco Covone, Brescia (IT); Roberto Zamboni, Brescia (IT)

(73) Assignee: KONOMAC S.R.L., Brescia (IT)

( * ) Notice: Subject to any disclaimer, the term of this patent is extended or adjusted under 35 U.S.C. 154(b) by 445 days.

(21) Appl. No.: 16/746,314

(22) Filed: Jan. 17, 2020

(65) Prior Publication Data

US 2020/0229449 A1 Jul. 23, 2020

(30) Foreign Application Priority Data

Jan. 17, 2019 (IT) .......................... 102019000000733

(51) Int. Cl.
*A21C 9/06* (2006.01)
*A21D 13/31* (2017.01)
*A21D 15/02* (2006.01)

(52) U.S. Cl.
CPC .............. *A21C 9/063* (2013.01); *A21D 13/31* (2017.01); *A21D 15/02* (2013.01)

(58) Field of Classification Search
CPC ............ A23C 9/063; A21C 3/06; A21C 3/065
See application file for complete search history.

(56) References Cited

FOREIGN PATENT DOCUMENTS

IT           VR20110096 A1 * 11/2012  ............. A23C 3/065

* cited by examiner

*Primary Examiner* — John J Norton
(74) *Attorney, Agent, or Firm* — Workman Nydegger

(57) ABSTRACT

A machine is configured to make a food roll, wherein a strip of dough is spirally wrapped around a food product elongated along an axis between two ends. The machine comprises a feed means for conveying a plurality of strips of dough that are spaced apart from each other along a forming path and a wrapping station for wrapping each strip of dough around a food product. The wrapping station comprises a positioning area, which is configured to position the strip of dough obliquely with respect to the axis of the food product, and a rolling area for the strip of dough, which is configured to wrap the strip of dough spirally around a food product starting from one of the ends of the food product. The rolling area comprises two spindles that are rotatable about an axis of rotation and each one having an attachment portion for retaining a food product at the ends thereof. The wrapping station comprises a distributor of food products configured to direct one food product at a time towards the rolling area so as to be gripped and retained by the spindles.

6 Claims, 6 Drawing Sheets

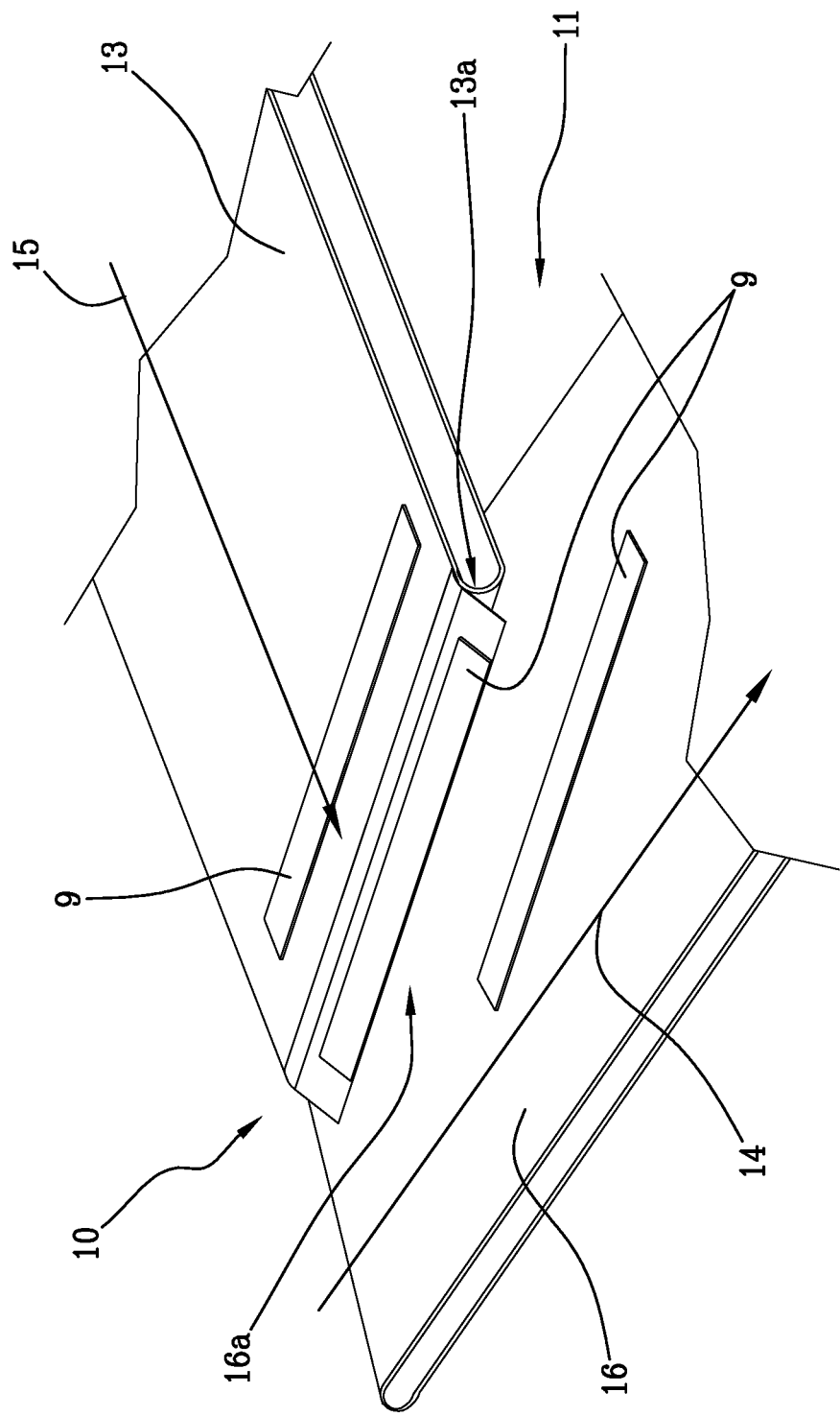

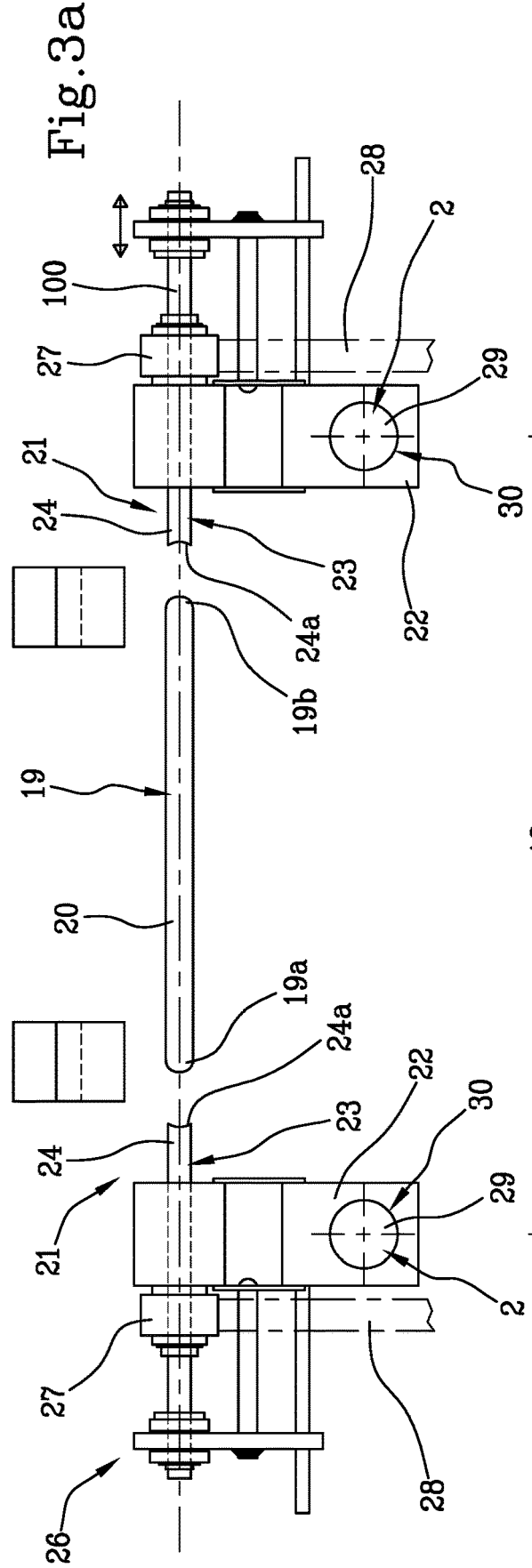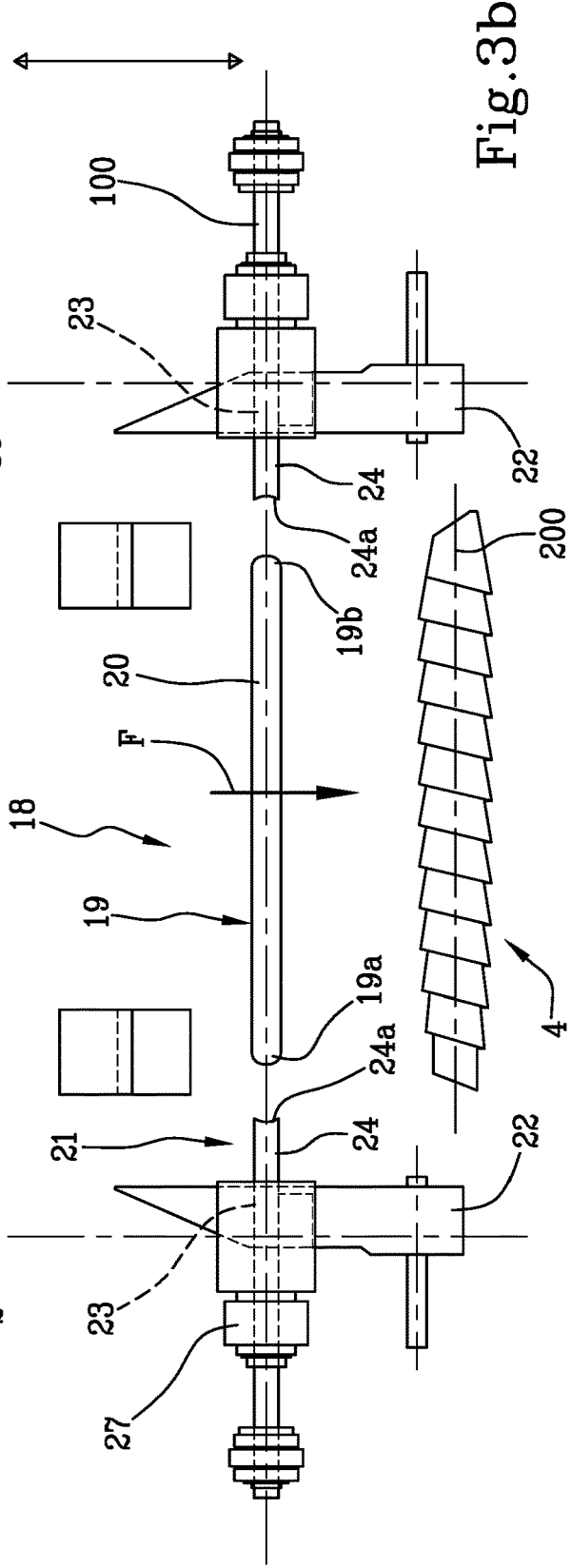

MACHINE FOR MAKING A FOOD ROLL

The present invention relates to a method and a machine for making a food roll.

The term "food roll" means a whole comprising a food product around which a strip of dough is spirally wrapped.

The food product is usually elongated along an axis thereof, on which it has two opposite axial ends. This elongated conformation can be due to the very nature of the food product and/or further processing. Examples of food products can be: frankfurters, sausages, or food cylinders or bars, for example based on cheese and/or fruit and/or vegetables, etc.

The strip of dough is spirally wrapped around the food product starting from one of the axial ends thereof and until covering it along its whole axial length.

The food roll can have closed or open ends, or it can be further divided into half to form a food tube.

Up to today, the practice has been known of manually wrapping a layer of dough around a food product. This manual operation is slow and imprecise and can generate small openings in the layer of dough, which can cause subsequent leakage of the filling as well as unattractive aesthetic results. Such drawbacks are accentuated in the case of high daily production rates.

In this context, the technical task at the basis of the present invention is to propose a method and a machine for making a food roll which overcome at least some of the above-mentioned drawbacks of the prior art.

In particular, it is an object of the present invention to provide a method and a machine for making a food roll that enable automated production in less time compared to the prior art and with greater quality.

Finally, it is an object of the present invention to provide a method and a machine for making a food roll that can be used by any operator irrespective of his or her manual abilities.

The stated technical task and the specified objects are substantially achieved by a method and a machine for making a food roll comprising the technical features disclosed in one or more of the appended claims.

In one or more of the aspects indicated, the present invention can comprise one or more of the features indicated in the dependent claims, incorporated herein by reference, each corresponding to a possible embodiment.

Additional features and advantages of the present invention will become more apparent from the approximate, and hence non-limiting, description of a preferred but non-exclusive embodiment of a method and a machine for making a food roll.

This description will be set out below with reference to the appended drawings, which are provided solely for illustrative and therefore non-limiting purposes, in which:

FIG. 2 shows an axonometric view of a first part of the machine for making a food roll illustrated in FIG. 1;

FIG. 3a shows a rear view of a second part of the machine for making a food roll illustrated in FIG. 1 in a first operating configuration, with some parts removed so as to better highlight others;

FIG. 3b shows a top view of the second part of the machine for making a food roll illustrated in FIG. 3a;

FIG. 4b shows a top view of the second part of the machine for making a food roll illustrated in FIG. 4a;

FIG. 5b shows a top view of the third part of the machine for making a food roll illustrated in FIG. 5a.

Figure 1:
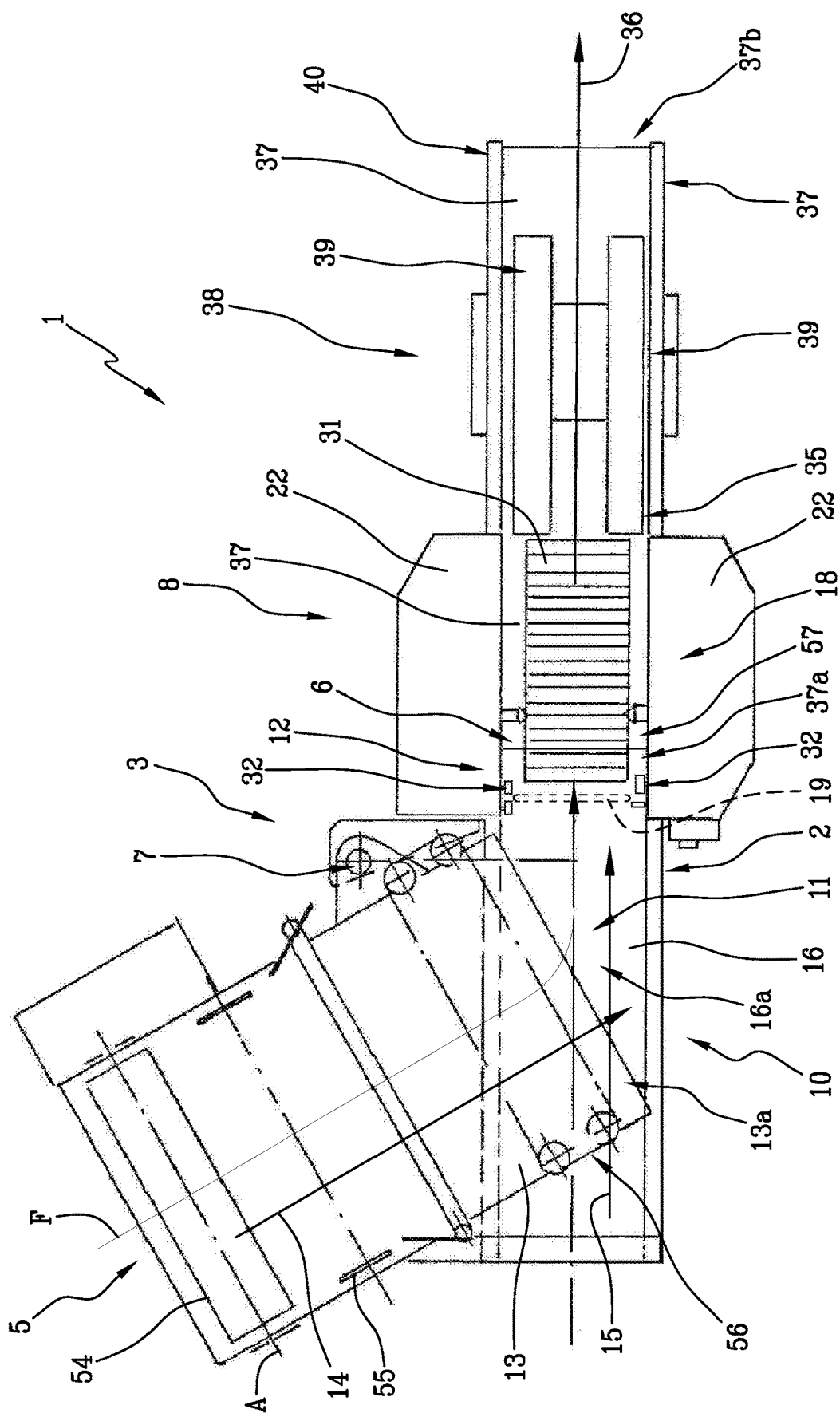
FIG. 1 shows a schematic top view of a machine for making a food roll in its entirety.

With reference to the aforesaid figures, the reference number 1 denotes in its entirety a machine for making a food roll 4, hereinafter indicated as the machine 1 for the sake of simplicity.

The food roll 4 is made by wrapping a strip of dough 9 around a food product 19, which has an elongated shape according to an axis 20 between two ends 19a, 19b.

The machine 1 comprises a frame 2. In particular, the frame 2 comprises supporting portions (not illustrated in the appended figures) which keep the rest of the machine 1 raised from the floor.

The machine 1 comprises a forming member 3 which is mounted on the frame 2 and extends along a forming path F from an entrance station 5 for the dough to an exit station 6 for the food roll 4. Even more in particular, the forming member 3 has, from the entrance station 5 to the exit station 6, a cutting station 7 for cutting strips of dough 9 and a wrapping station 8 for wrapping the strips of dough 9 over the food product 19.

The forming member 3 further comprises a feed means 10 for conveying the dough along the forming path F from the entrance station 5 to the exit station 6.

In detail, the forming member 3, at the entrance station 5, comprises a motorised unrolling shaft A activatable on a roll of dough 54 arranged on top of it. In other words, during use, the roll of dough 54 is mounted on the unrolling shaft A and is unrolled so as to position a ribbon of dough on the feed means 10.

In fact, the roll of dough 54 comprises said ribbon of dough rolled up on itself.

This roll of dough 54 is of the commercially known type and will therefore not be further described hereinbelow.

Furthermore, the forming member 3 comprises, downstream of the unrolling shaft A, according to the forming path F, trimming rollers 55 active on the ribbon of dough in order to trim it laterally depending on the width of the ribbon of dough it is desired to obtain. These trimming rollers 55 are spaced apart from each other and act upon the lateral edges of the ribbon of dough.

In addition, the ribbon of dough, after having been trimmed laterally, is cut into strips of dough 9 at the cutting station 7. In particular, the forming member 3, at the cutting station 7, comprises a cutting means 56 cyclically active on the ribbon of dough. By way of example, the cutting means 56 comprises a vertically descending guillotine which is active on the ribbon of dough positioned under the guillotine itself, or a cross-cutting wheel operating on the ribbon of dough.

In the preferred embodiment, the feed means 10 is intermittently driven in such a way that the ribbon of dough advances in an intermittent fashion. In other words, the feed means 10 is active (moves) during a first interval of time and is inactive (stationary) during a second interval of time following the first. During the operation of the machine 1, said intervals of time follow each other in a consecutive fashion.

In this manner, the cutting means 56 act upon the ribbon of dough unrolled during the second interval of time, i.e. when the feed means 10 is inactive and the ribbon of dough is stationary. This enables a precise cut of the ribbon of dough to be carried out in order to form the strips of dough 9.

Each strip of dough 9 extends along a longitudinal direction of extension between two opposite ends.

After the cutting station 7, each strip of dough 9 is conveyed by the feed means 10 to the wrapping station 8. In particular, the feed means 10 conveys one strip of dough 9 at a time along the forming path F so as to keep the strips of dough 9 spaced apart from each other.

At the wrapping station 8, each strip of dough 9 is wrapped over a food product 19 in order to form a food roll 4 extending along an axis 200 of extension thereof between two opposite ends 4a, 4b.

In the preferred embodiment, the wrapping station 8 comprises a positioning area 11 for positioning the strip of dough 9 and a rolling area 12 for rolling the strip of dough 9 over the food product 19.

In other words, the forming member 3 has a positioning area 11 for positioning the strips of dough 9 and a rolling area 12 for rolling the strips of dough 9. In fact, in the positioning area 11 the strips of dough 9 are positioned correctly for wrapping, which takes place in the rolling area 12.

In detail, the feed means 10 comprising a first positioning belt 13 and a second positioning belt 16 located downstream of the first positioning belt, according to the forming path, and operatively connected to each other. In other words, the forming member 3 comprises a first positioning belt 13 and a second positioning belt 16. In even greater detail, the first positioning belt 13 and the second positioning belt 16 are operatively connected to each other in the positioning area 11 for positioning the strips of dough 9.

Furthermore, the first positioning belt 13 extends longitudinally along a feed direction 14 from the cutting station 7 towards an unloading end 13a. The second positioning belt 16 extends along a feed direction 15 from a loading end 16a towards the rolling area 12.

In particular, the feed direction 15 of the second positioning belt 16 is inclined with respect to the feed direction 14 of the first positioning belt 13. Even more in particular, the projections of the feed direction 15 of the second positioning belt 16 and of the feed direction 14 of the first positioning belt 13 on a horizontal plane are inclined with respect to each other by a predefined angle.

Preferably, said predefined angle is substantially variable and adjustable according to need. In any case, the angle is preferably other than 90° so as to enable the subsequent spiral wrapping of the strip of dough 9.

In other words, the first positioning belt 13 and the second positioning belt 16 extend along feed directions 14, 15 inclined with respect to each other so that each strip of dough 9, in passing from the first positioning belt 13 to the second positioning belt 16, is arranged obliquely on the second positioning belt 16 with respect to the feed direction 15 of the second positioning belt 16.

In addition, the two positioning belts 13, 16 are offset from each other. Precisely, the first positioning belt 13 is set above the second positioning belt 16, at least in part, so that, during use, each strip of dough 9 passes from the first positioning belt 13 to the second positioning belt 16 by falling (FIG. 2).

In other words, the unloading end 13a of the first positioning belt 13 is set above the loading end 16a of the second positioning belt 16 so that, during use, the strip of dough 9 is unloaded by virtue of gravity from the unloading end 13a of the first positioning belt 13 to the loading end 16a of the second positioning belt 16. In this manner, as the feed directions of the two positioning belts are inclined with respect to each other, the direction of extension of the strip of dough 9, once unloaded onto the second positioning belt 16, is inclined with respect to the feed direction 15 of the second positioning belt 16.

Precisely, the direction of extension of the strip of dough 9 is inclined with respect to the feed direction 15 of the second positioning belt 16 by the same predefined angle of inclination as between the feed direction 15 of the second positioning belt 16 and the feed direction 14 of the first positioning belt 13.

Furthermore, the forming member 3 comprises a synchronization means operatively connected to the first positioning belt 13 and the second positioning belt 16 so as to coordinate them with each other. In detail, the synchronization means periodically brings the second positioning belt 16 to a stop with respect to the first positioning belt 13 at the moment of the passage of each strip of dough 9 from the first positioning belt 13 to the second positioning belt 16.

In this manner, an optimal positioning of the strip of dough 9 on the second positioning belt 16 is achieved.

In fact, during use, stopping the second positioning belt 16 makes it possible to avoid shifts of the strip of dough 9 falling on it due to the movement of the second positioning belt 16 itself.

The term "optimal positioning" means that the direction of extension of the strip of dough 9 is inclined with respect to the feed direction 15 of the second positioning belt 16 by the same predefined angle of inclination as between the feed direction 15 of the second positioning belt 16 and the feed direction 14 of the first positioning belt 13.

In detail, synchronization means keeps the second positioning belt 16 stopped until the strip of dough 9 has entered into contact with the second positioning belt 16.

The synchronization means is preferably of a mechanical type and comprises a rotating cogwheel that times the periodic stopping of the second positioning belt 16.

In particular, the first positioning belt 13 and the second positioning belt 16 are motorized independently of each other. In other words, each positioning belt is connected to a respective specific motor. The synchronization means controls the switching on or off of each specific motor.

As already said, downstream of the positioning area 11 there is a rolling area 12 for wrapping each strip of dough 9 over the food product 19 in order to form a food roll 4.

The feed means 10 preferably also extends in the rolling area 12. Precisely, the rolling area 12 is positioned in proximity to the exit station 6.

In particular, the second positioning belt 16 of the feed means 10 extends in the rolling area 12. This second positioning belt 16 defines a conveyor surface on which the strips of dough 9 are positioned.

Furthermore, the forming member 3 comprises a wrapper 18 positioned in the rolling area 12 in order to wrap each strip of dough 9 over the food product 19. In other words, the wrapper 18 is mounted on the frame 2 and is positioned along the forming path F downstream of the positioning area 11. In still other words, the wrapper 18 is positioned in proximity to the exit station 6.

In particular, the wrapper 18 is suitable for receiving one food product 19 at a time (FIG. 3a).

This wrapper 18 comprises at least one attachment member 21 mounted on the frame 2 and movable between a forward position (FIGS. 4a and 4b), in which it retains the food product 19, and a retracted position (FIGS. 3a and 3b), in which it releases the food product 19. In particular, the attachment member 21 is movable along a direction substantially orthogonal to the forming path F and parallel to the conveyor surface.

Even more particularly, the attachment member 21 is spaced vertically apart from the conveyor surface so as to maintain the food product 19 raised relative to the second positioning belt 16 during the forward position.

The wrapper 18 preferably comprises two mutually opposing attachment members 21 between which the food product 19 is positioned during use. In other words, the two attachment members 21 are spaced from each other in a direction that is substantially transversal to the forming path F and substantially parallel to the conveyor surface.

In still other words, each attachment member 21 is positioned at a respective end 19a, 19b of the food product 19. In detail, the attachment members 21 are closer to each other in the forward position and farther away from each other in the retracted position.

In this manner, during the forward position the attachment members 21 retain the food product 19 at the ends 19a and 19b, whilst during the retracted position the attachment members 21 release the food product 19.

As may be seen in FIG. 3a, the forming member 3 comprises two lateral supports 22 mounted in the rolling area 12 so as to support the wrapper 18.

Furthermore, the second positioning belt 16 is positioned between the two lateral supports 22 and slides between them during use.

As may be seen in the appended figures, each attachment member 21 comprises a respective spindle 23 rotatable about an axis of rotation 100. Each spindle 23 is preferably rotatable about the same axis of rotation 100.

Furthermore, each spindle 23 is mounted slidably on a respective lateral support 22 so as to be able to slide along a direction transversal to the forming path F and parallel to the conveyor surface. In detail, the sliding of the spindle 23 along the direction transversal to the forming path F and parallel to the conveyor surface defines the forward position and the retracted position of the respective attachment member 21.

Advantageously, each spindle 23 comprises an attachment portion 24 projecting in cantilever fashion over the second positioning belt 16. Therefore, the wrapper 18 comprises two attachment portions 24 which, during the forward position, retain the food product 19.

Each attachment portion 24 preferably has a concave end 24a configured to partially wrap around one of the ends 19a, 19b of the food product 19.

In addition, the wrapper 18 comprises a rotation means 26 for rotating each spindle 23 about the axis of rotation 100. The rotation means 26 preferably enables the food product 19 to be rotated about the axis 20 thereof. In the appended figures it is possible to see that the rotation means 26 comprises two pulleys 27, each keyed onto a respective spindle 23 so as to make it rotate.

Furthermore the rotation means 26 comprises a motor (not represented in the appended figures) connected to the pulley 27 by means of a belt 28.

It should be noted that, during the forward position, the axis of rotation 100 is coaxial with the axis 20 of the food product 19.

Furthermore, the wrapper 18 is cyclically movable from the rolling area 12 to a releasing area 57 for releasing the food product 19. Precisely, the releasing area 57 for releasing the food product 19 is located downstream of the rolling area 12.

Furthermore, the releasing area 57 is located on an outfeed belt 37. In detail, the outfeed belt 37 extends downstream of the rolling area 12 between an entrance end 37a and an exit end 37b thereof. In other words, the entrance end 37a of the outfeed belt 37 is positioned between the rolling area 12 and the releasing area 57 for releasing the food product 19. In still other words, during use, after rolling, the food roll 4 is released onto the outfeed belt 37.

As may be seen in the appended figures, the lateral supports 22 are mounted slidably on the frame 2 so as to take the wrapper 18 from the rolling area 12 to the releasing area 57. In particular, the frame 2 comprises two rods 29 arranged parallel to the forming path F, each at a respective lateral support 22.

Furthermore, each lateral support 22 has a sliding hole 30 in which a respective rod is inserted 29 (FIG. 3a).

The machine 1 comprises a distributor of food products 19, preferably a feeder 31 arranged above the rolling area 12 and having an opening complementarily shaped to a food product 19 for one food product 19 at a time to exit towards the rolling area by virtue of gravity. The feeder 31 is mounted in the releasing area 57.

The feeder 31 is preferably mounted above the outfeed belt 37 and attachment members 21 so that the food products 19 descend towards the wrapper 18, positioned in the releasing area 57, by virtue of gravity. In this manner, during use, each food product 19 descends from the feeder 31 towards the wrapper 18 and is engaged by the wrapper 18 itself.

In fact, after the strip of dough 9 has been rolled around food product 19, the wrapper 18 is conveyed from the rolling area 12 towards the releasing area 57.

Figure 4A:
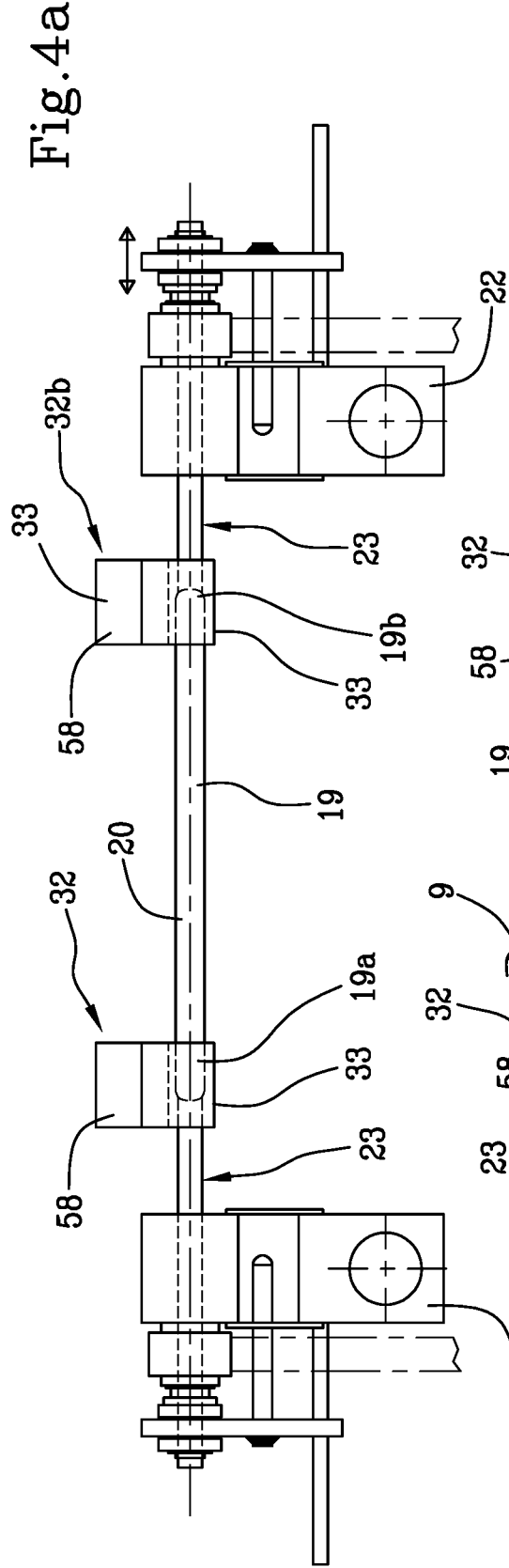
FIG. 4a shows a rear view of the second part of the machine for making a food roll illustrated in FIG. 3a in a second operating configuration.
Figure 4B:
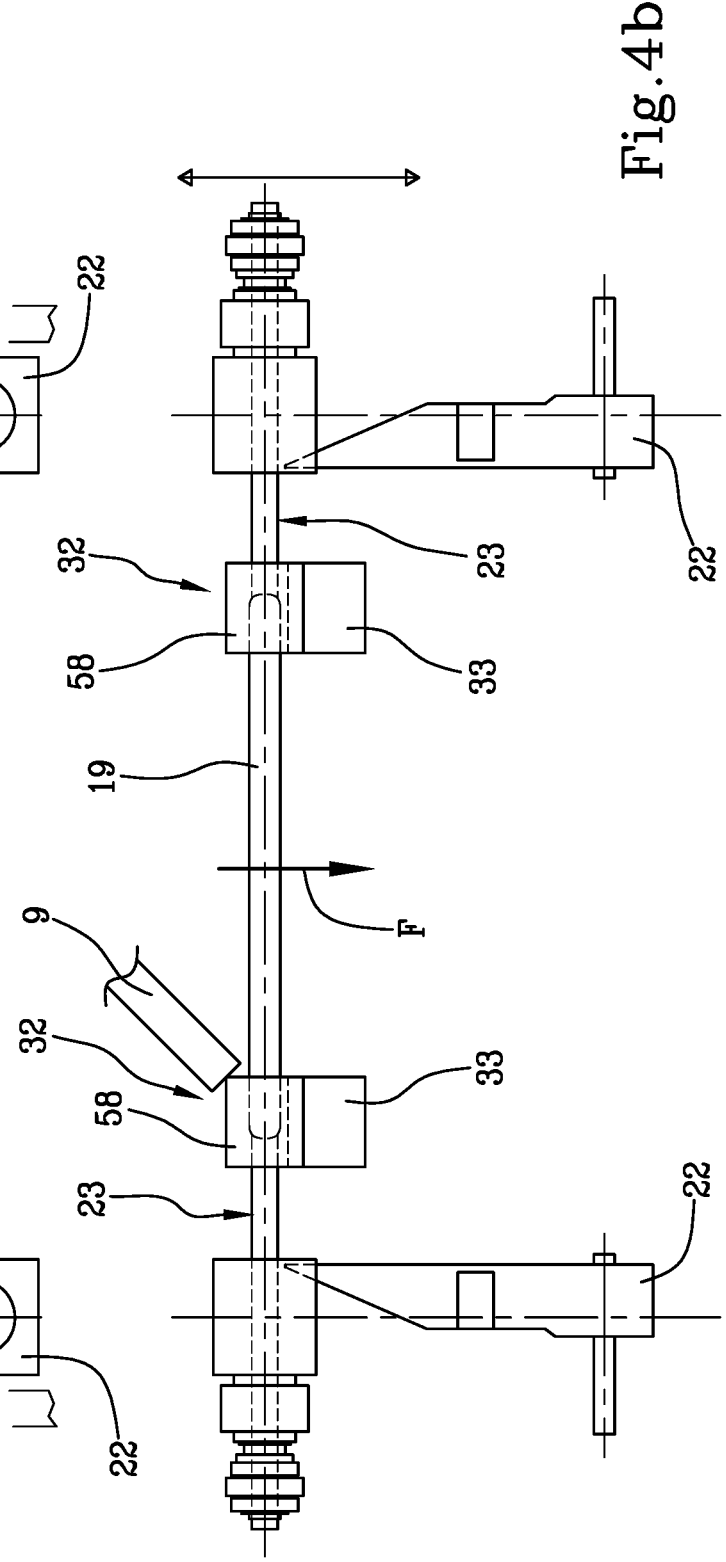

During the movement from the rolling area 12 to the releasing area 57, the wrapper 18 at a first moment releases the food roll 4 and at a second moment, following the first, engages a new food product 19. The wrapper 18 subsequently returns from the releasing area 57 to the rolling area 12 (FIGS. 4a, 4b).

The machine 1 comprises at least one adhesion member 32 positioned in the pick-up position so as to help, during use, the initial wrapping of the strip of dough 9 over the food product 19.

The wrapping of the strip of dough 9 over the food product 19 takes place spirally, for example from the first ends 19a to the second ends 19b.

The adhesion member 32 preferably comprises an upward roller 33 operatively associated with the wrapper 18 so as to enable the upward movement of the strip of dough 9 onto the food product 19. In addition, the upward roller 33 is motorized so as to rotate on its axis in a direction opposite to the feed direction 15 of the second positioning belt 16.

Precisely, the upward roller 33 defines a surface in contact with the strip of dough 9. This contact surface, in a part closer to the second positioning belt 16, moves forward in a direction contrary to the feed direction 15 of the positioning belt 16. In particular, the upward roller 33 is positioned at an attachment member 21. Even more particularly, the upward roller 33 is positioned downstream of the rolling area 12, so as to make the strip of dough 9 rise onto the food product 19 during use.

As may be seen in the appended figures, the adhesion member 32 also comprises a curving roller 58 operatively associated with the upward roller 33 so as to lead the strip of dough 9 into being rolled around the food product 19. The curving roller 58 is motorized and rotates in the same direction as the upward roller 33.

In particular, the curving roller 58 is positioned above the upward roller 33, so that the strip of dough 9, once it has been made to rise by means of the upward roller 33, enters into contact with the curving roller 58. In other words, the curving roller 58 is spaced farther from the feed means 10 than the upward roller 33.

The upward roller 33 and the curving roller 58 are preferably positioned at the first ends 19a of the food product 19 so as to favour the initial wrapping of the strip of dough 9. Alternatively, a further adhesion member 32b can be provided at the second ends 19b of the food product 19, which can be structurally analogous to the adhesion member 32. The further adhesion member 32b can be made to operate like the adhesion member 32 depending on the inclination of the strip of dough, or else it can be left idle so as to favour the closure of the dough shell.

The machine 1 can optionally comprise one or more cutting members (not illustrated in the appended figures) positioned downstream of the wrapper 18 and activatable on the food roll 4 so as to cut it in one or more pre-established positions (at the ends or in intermediate positions between the ends). In particular, each cutting member is configured to cut only the layer of dough 9 and not the food product 19 inside it. Preferably, and solely by way of example, each cutting member comprises a rotating disk, for example idle, resting on the food roll 4 by virtue of gravity.

The machine 1 comprises a conveying means 35 mounted on the frame 2 and defining a rest surface for the food roll 4 so as to carry it along a feed path 36.

The conveying means 35 is a continuation of the second positioning belt 16. In other words, the conveying means 35 is a continuation of the feed means 10. In still other words, the conveying means 35 is mounted downstream of the feed means 10 along the forming path F.

Furthermore, the feed path 36 is a continuation of the forming path F. The feed path 36 preferably extends in a rectilinear fashion.

The conveying means 35 preferably comprises an outfeed belt 37 for taking food rolls 4 from the rolling area 12 to a closing area 38 positioned downstream of the rolling area 12. Precisely, the outfeed belt 37 extends starting from the rolling area 12 to the whole closing area 38. In other words, the outfeed belt 37 extends from the exit station 6 of the forming member 3 to the whole closing area 38.

In accordance with the present invention, the machine 1 comprises a closing member 39 mounted on the frame 2 and extending along the feed path 36 at least between a first passage section S1 for the food roll 4 and a second passage section S2 for the food roll 4.

In particular, the second passage section S2 has a width, measured transversely to the feed path 36 and parallel to the rest surface, which is smaller than the width, measured transversely to the feed path 36 and parallel to the rest surface, of the first passage section S1 so as to close, by contact, the ends 4a,4b of the food roll 4.

Figure 5A:
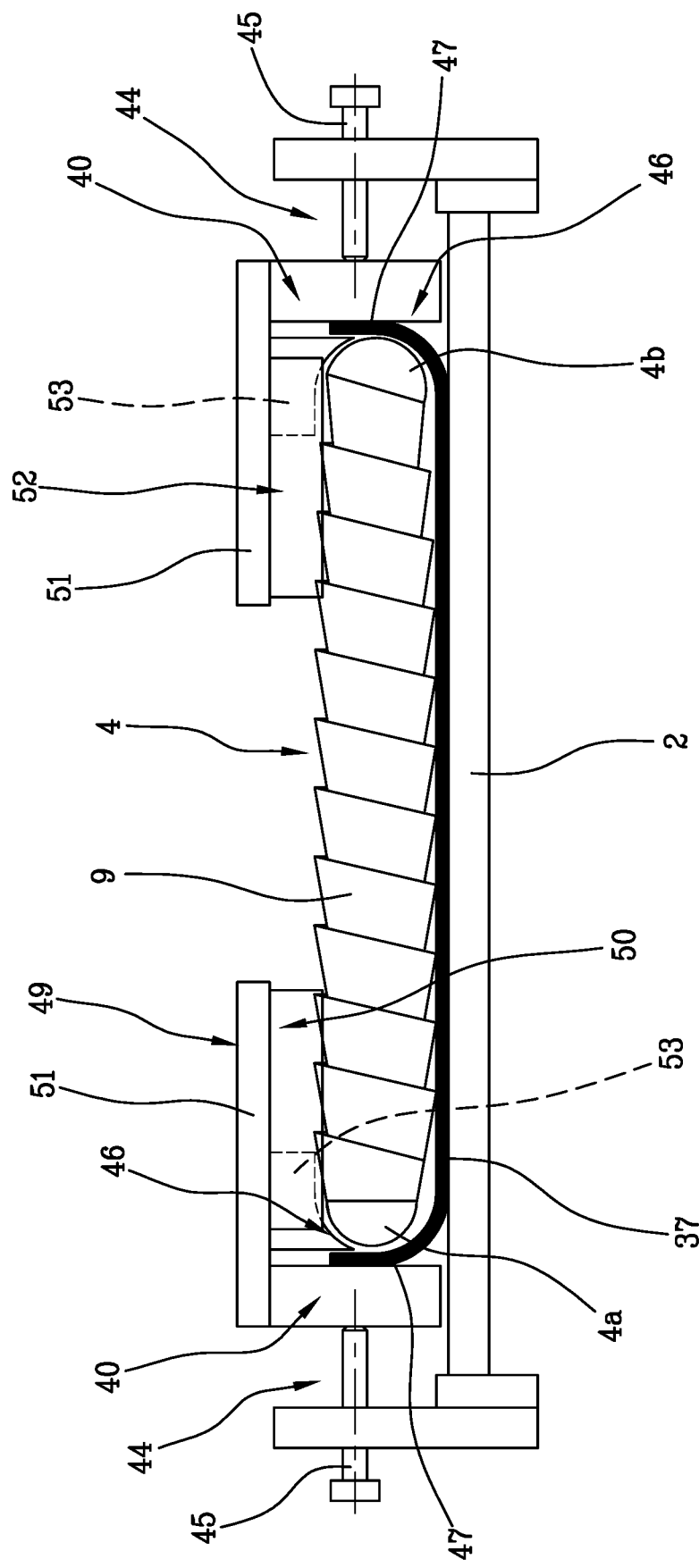
FIG. 5a shows a front view of a third part of the machine for making a food roll illustrated in FIG. 1.

Even more particularly, the closing member 39 comprises a pair of lateral partitions 40 which rise from the rest surface and are mounted on the frame 2 at the conveying means 35. In FIG. 5a it is possible to see that the partitions 40 extend transversely to the rest surface.

Furthermore, the lateral partitions 40 are spaced apart from each other so as to define between them, along the feed path 36, the first passage section S1 and the second passage section S2.

Figure 5B:
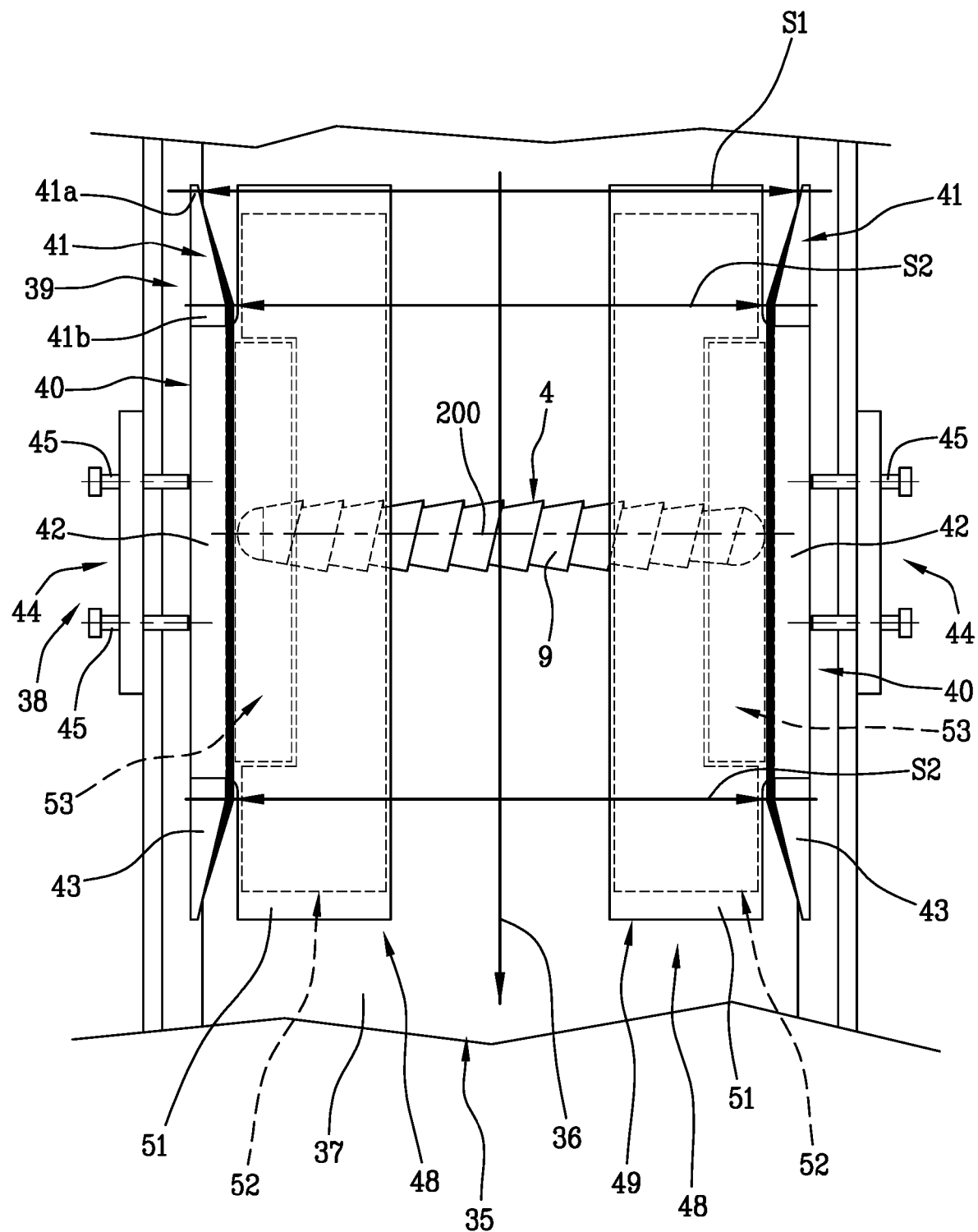

As may be seen in FIG. 5b, each lateral partition 40 comprises a narrowing portion 41 which extends from the first passage section S1 towards the second passage section S2. This narrowing portion 41 defines a surface that is inclined with respect to a vertical surface. In particular, the inclined surfaces defined by the narrowing portions intersect downstream of the closing member 39 along the feed path 36.

Furthermore, the narrowing portion 41 extends along the feed path 36 from a first end 41a to a second end 41b. The first passage section S1 is defined by the distance between the first ends 41a of the respective narrowing portions. The second passage section S2 is defined by the distance between the second ends 41b of the respective narrowing portions 41.

Each lateral partition 40 further comprises a rectilinear portion 42 connected to the narrowing portion 41 and downstream thereof along the feed path 36.

The rectilinear portion 42 of the lateral partition 40 is substantially transversal to the rest surface and substantially parallel to the feed path 36. In particular, the distance between the rectilinear portions 42 of the lateral partitions 40 is substantially constant along the feed path 36, where said distance is measured transversely to the feed path 36. Furthermore, the distance between the rectilinear portions 42 of the lateral partitions 40 is equal to the second passage section S2.

Therefore, the second passage section S2 extends for the whole length of the rectilinear portions 42.

Finally, each lateral partition 40 comprises a widening portion 43 connected to the rectilinear portion 42 and positioned downstream thereof. The widening portions of the lateral partitions 40 together define a widening of the passage section, measured transversely to the feed path 36, for the exit of the food roll 4 from the closing area 38.

Preferably, the narrowing portion 41, the rectilinear portion 42 and the widening portion 43 together form a single body (FIG. 5b).

The machine 1 further comprises an adjustment means 44 which is active between the lateral partitions 40 so as to bring them closer together and/or farther from each other in order to adjust the width of the first passage section S1 and the width of the second passage section S2.

The adjustment means 44 preferably comprises at least one screw 45 for each lateral partition 40. Each screw 45 is screwed into the supporting frame 2 and comes up against the lateral partition 40.

Advantageously, each lateral partition 40 is slidably mounted on the frame 2 and is movable along a direction substantially perpendicular to the feed path 36 in order to widen or narrow the first and second passage sections S2. In this manner, by tightening or loosening the screws 45 of the adjustment means 44, the width of the passage sections is adjusted.

In particular, tightening the screws 45 will decrease the width of the first passage section S1 and the second passage section S2, whereas loosening the screws 45 will increase the width of the first passage section S1 and the second passage section S2.

In the preferred embodiment illustrated, for example, in FIG. 5b, the adjustment means 44 comprises two screws 45 for each lateral partition 40. The screws 45 are arranged one downstream of the other along the feed path 36 so as to stabilize the respective lateral partition 40.

In addition, the lateral partitions 40 are spaced apart from each other and the conveying means 35 is disposed between them, at least in part. Precisely, the outfeed belt 37 is disposed between the partitions, at least in part.

Furthermore, the machine 1 comprises a conveyor means 46 slidably mounted on each lateral partition 40 and movable in synchrony with the conveying means 35 so as to accompany the movement of the ends 4a,4b of the food roll 4 from the first passage section S1 to the second passage section S2.

The conveyor means 46 is preferably disposed transversely to the rest surface.

In addition, the conveyor means 46 is preferably synchronized with the conveying means 35.

In particular, in the preferred embodiment shown for example in FIG. 5a, the outfeed belt 37 extends at least between the first passage section S1 and the second passage section S2. The outfeed belt 37 preferably extends for the whole length of the lateral partitions 40.

Furthermore, the outfeed belt 37 has lateral edges 47 partially folded over and each sliding on a respective lateral partition 40 so as to define the conveyor means 46 (FIG. 5a).

In other words, the conveyor means 46 is defined by a folding of the outfeed belt 37 in the lateral partitions 40. In still other words, each lateral edge 47 of the outfeed belt 37 is slidably resting on a respective lateral partition 40 in order to accompany the movement of the ends 4a,4b of the food roll 4 from the first passage section S1 to the second passage section S2.

The lateral edges 47 of the outfeed belt 37 are part of the outfeed belt 37 itself and extend longitudinally along part of the feed path 36.

Furthermore, the closing member 39 comprises a rolling means 48 for rolling the food roll 4 and which is active at least between the first passage section S1 and the second passage section S2 in order to make the food roll 4 roll about the axis 200 of longitudinal extension thereof along the feed path 36.

The rolling means 48 is preferably active along the entire length of the lateral partitions 40.

In particular, the rolling means 48 comprises a portion of the conveying means 35 comprised between the first passage section S1 and the second passage section S2. Furthermore, the rolling means 48 comprises at least one shelf 49 mounted on the frame 2 and extending along the feed path 36. The shelf 49 is spaced vertically from the portion of the conveying means 35 and defines a fixed surface 50 of contact with the food roll 4 facing the conveying means 35 so as to make the food roll 4 roll about the axis 200 of longitudinal extension thereof during the forward movement of the conveying means 35.

In other words, the food roll 4, conveyed by the conveying means 35, rotates thanks to the contact with the fixed shelf 49. In still other words, the food roll 4 is in contact with both the fixed shelf 49 and the conveying means 35 in movement during use.

The distance of the shelf 49 from the outfeed belt 37 is preferably substantially equal to the height of a food roll 4 measured transversely to the axis 200 of longitudinal extension thereof.

Precisely, the portion of the conveying means 35, which is part of the rolling means 48, is defined by the conveying means 35 comprised between the lateral partitions 40. In detail, the portion of the conveying means 35, which is part of the rolling means 48, is defined by a portion of the outfeed belt 37 comprised between the lateral partitions 40.

The shelf 49 preferably comprises two coplanar portions 51 which are spaced from each other (FIGS. 5a, 5b). Each portion 51 of the shelf 49 is mounted in cantilever fashion on a respective lateral partition 40 so as to act on the ends 4a,4b of the food roll 4.

Furthermore, in FIG. 5b it is possible to see that the portions of the shelf 49 are spaced apart from each other so as to leave between them a free space through which it is possible to observe, during use, the passage of the food roll 4.

The outfeed belt 37 and the shelf 49 together define a tunnel for closing the food roll (FIG. 5a).

In addition, the shelf 49 comprises a gripping layer 52 facing the outfeed belt 37 of the conveying means 35 so as to define the fixed surface 50 of contact. This gripping layer 52 is made of elastically deformable material so as to grip the food roll 4.

The gripping layer 52 preferably extends for the entire length of the shelf 49.

In detail, the gripping layer 52 comprises shaped portions 53 active on the ends 4a,4b of the food roll 4, each positioned at a respective lateral partition 40. Each shaped portion 53 defines a section narrowing towards a respective lateral partition 40 along a direction transversal to the feed path 36 and parallel to the rest surface in order to favour a shaped closure of the ends 4a,4b.

The closing area 38 is preferably configured to close the ends of the food rolls hermetically.

The distance of the shelf 49 from the outfeed belt 37 is preferably slightly less than the height of a food roll 4 measured transversely to the axis 200 of longitudinal extension. In this manner, it is possible to press the ends of the roll so as to achieve the hermetic closure. Advantageously, the pressure exerted by the shelf 49 together with the rolling process inside the tunnel favours the "blending" together of the dough ends and the sealing of the ends.

As regards the operation of the present invention, it follows directly from what was described above.

The forming member 3 cuts the dough into strips and then wraps them over the food product 19 so as to form the food roll 4. In detail, the cut strips of dough 9 are positioned transversely to the forming path F in a positioning area 11.

In the positioning area 11, in fact, the first positioning belt 13 is inclined with respect to the second positioning belt 16 so that the strip of dough 9, when passing from one positioning belt to the other, is arranged obliquely with respect to the forming path F.

Thereafter, the strip of dough 9 is spirally rolled over the food product 19 in the rolling area 12. In particular, the strip of dough 9 is oblique with respect to the axis 20 of the food product 19 so that the rotation of the food product 19 enables the formation of the food roll 4. Even more particularly, the food product 19 is set into rotation by the rotation means 26 active on the ends thereof by means of the spindles 23.

In detail, one food product 19 at a time is positioned in the rolling area 12 and held at the ends 19a, 19b. One strip of dough 9 at a time is made to advance along the forming path F and is spirally wrapped over the food product 19.

Preferably, a plurality of food products 19 are inserted in the distributor (feeder 31) so as be directed one at a time towards the rolling area 12.

Possible examples of food products 19 can be: frankfurters, sausages, and food cylinders or bars, for example based on cheese and/or fruit and/or vegetables, etc. In some cases it can be advantageously envisaged to harden the food product 19, for example by cooling and/or freezing, before placing it in the rolling area, in particular before it is introduced into the distributor.

Once the food roll 4 has been formed, the spindles 23 release it in proximity to the exit station 6. At this point, the food roll 4 can enter the closing area 38 and then the closing tunnel.

In particular, the ends 4a,4b of the food roll 4 are closed by contact with the lateral folded over edges 47 of the outfeed belt 37. Furthermore, the food roll 4 rotates by virtue of the contact with the shelf 49. This rotation favours the closure of the ends 4a,4b thereof.

The invention claimed is:

1. A machine for making a food roll comprising a food product and a strip of dough spirally wrapped around said food product, wherein said food product is elongated along an axis between two ends, said machine comprising:
 a feed means for conveying a plurality of strips of dough that are spaced apart from each other along a forming path, from one entrance station for the dough to an exit station for the food roll,
 a wrapping station for wrapping each strip of dough around a food product, said wrapping station comprising a positioning area, which is configured to position the strip of dough obliquely with respect to the axis of the food product, and a rolling area for the strip of dough which is configured to wrap the strip of dough spirally around a food product starting from one of the ends of the food product,
 a closing area located upstream of said exit station and configured to close the axial ends of the food roll,
 wherein said rolling area comprises two spindles that are rotatable about an axis of rotation and each one having an attachment portion for retaining a food product at said ends,
 said wrapping station comprising a distributor of food products which is configured to direct one food product at a time towards the rolling area so as to be gripped and retained by said spindles, wherein each attachment portion has a concave end configured to partially wrap one of the ends of said food product.

2. The machine according to claim 1, wherein said distributor comprises a feeder for storing the food products which is arranged above the rolling area and has an opening complementarily shaped to a food product for one food product at a time to exit towards the rolling area, at the spindles, by virtue of gravity.

3. The machine according to claim 1, wherein each spindle is movable between a forward position suitable for retaining the food product and a retracted position suitable for releasing the food product.

4. The machine according to claim 1, wherein said closing area is located immediately upstream of said exit station, so that said food roll is released whole at said exit station and said food product is completely wrapped by the strip of dough.

5. The machine according to claim 1, wherein the closing area is configured to hermetically close the axial ends.

6. The machine according to claim 1, wherein said closing area is located immediately upstream of said exit station, so that said food roll is released whole at said exit station and said food product is completely wrapped by the strip of dough, and said closing area is configured to hermetically close the axial ends.

* * * * *